No. 771,198. PATENTED SEPT. 27, 1904.
F. L. WOLVERTON.
DOUBLETREE.
APPLICATION FILED FEB. 9, 1903.
NO MODEL.
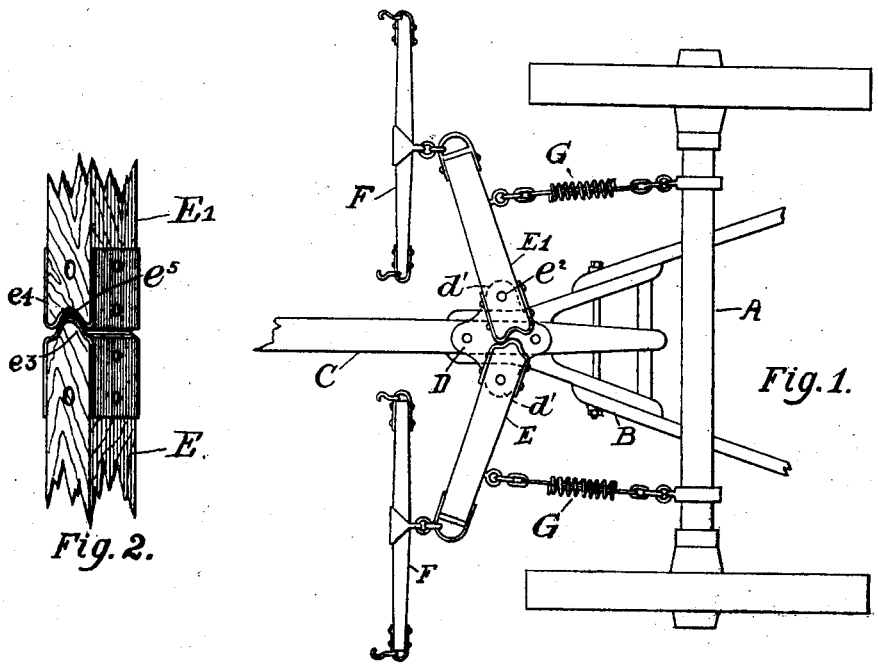
Fig. 1.
Fig. 2.
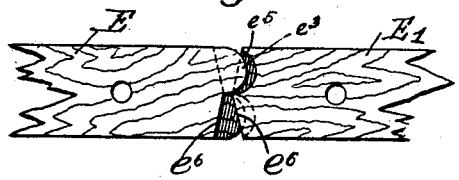
Fig. 3.
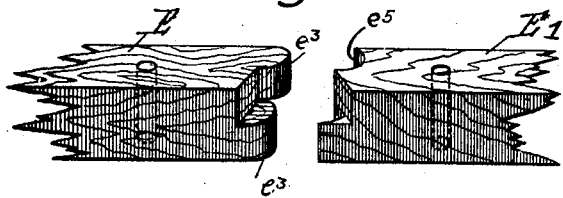
Fig. 4.
Witnesses
Inventor
Frank L. Wolverton
By his Attorney
Frederick Benjamin No. 771,198. Patented September 27, 1904.

UNITED STATES PATENT OFFICE.

FRANK L. WOLVERTON, OF LUXORA, ARKANSAS.

DOUBLETREE.

SPECIFICATION forming part of Letters Patent No. 771,198, dated September 27, 1904.

Application filed February 9, 1903. Serial No. 142,444. (No model.)

*To all whom it may concern:*

Be it known that I, FRANK L. WOLVERTON, a citizen of the United States, residing at Luxora, in the county of Mississippi and State of Arkansas, have invented certain new and useful Improvements in Doubletrees, of which the following is a specification.

This invention relates to improvements in the form, construction, and arrangement of doubletrees for use on wagons, plows, implements, or machines drawn by two or more horses or other draft-animals.

An important object attained by my invention is the transfer of a part of the tension or draft produced by the animal hitched to one end of the doubletree to the opposite end of the latter, not for the purpose of increasing the load to be drawn by the animal hitched to such opposite end, as in the so-called "draft equalizers or eveners," but with a view of keeping the laggard or weaker animal abreast with his mate, who is doing the most of the pulling, and thereby encouraging him to do his share.

My invention is designed especially for use under conditions where there is little continuity of draft or where a team is unequally matched as to strength or activity, thus producing a succession of jerks or sudden pulls which result in breaking harness or the draft devices to which the animals are attached. The doubletree may be advantageously used, however, under all conditions, as it possesses all of the functions of the common article and in addition has some of its own due to its peculiar structure.

In the accompanying drawings, which form a part of this application, I have shown two forms of doubletrees which embody the principles of my invention.

Figure 1 is a plan view of my invention connected with the tongue of a wagon and showing the position of the doubletree when under tension. Fig. 2 is a perspective view showing the coacting ends of the doubletree-sections. Fig. 3 is a top plan view showing the coacting ends of a doubletree of a modified form; and Fig. 4 is a perspective view of the parts shown in Fig. 3, but disconnected.

Referring to the details of the drawings, A represents the front axle of a wagon, B the front hounds, and C the tongue, said parts being of well-known construction and arrangement.

D is a metal plate rigidly bolted to the upper side of the rear portion of the tongue and provided with lateral extensions $d'$. Pivotally mounted on the plate extensions by bolts $e^2$ are two sections E E', which constitute the chief features of my improved doubletree. These sections are so arranged that their inner ends, which extend considerably beyond their pivots, have a loose contact with each other. The inner end of section E is formed with a rounded extension or convex portion $e^3$, and the corresponding end of section E' is formed with a socket $e^5$, which is adapted to receive the extension $e^3$, thus producing a knuckle-joint between said sections, as clearly shown. When the parts are made from hard wood, the coacting faces at the joint need not be reinforced by the metal bands $e^4$, illustrated as applied to the extension and socket, as the wood surfaces if kept lubricated will stand considerable frictional wear.

It will be apparent from the construction described that draft applied to one of the doubletree-sections in excess of that on the complementary section will serve to produce a like movement of the latter. It would also be apparent that unless some means were provided to check the forward movements of the two sections their outer ends would come together and the device would be inoperative. To avoid this trouble, I attach to the rear edge of each doubletree-section a cushioning or tension device G of well-known form, the other end of which is connected with the axle or other part connecting the load with the draft appliances. The cushioning devices permit the forward movement of the outer ends of the sections freely at the beginning of the pull; but as the draft is increased the resistance of said devices increases in greater ratio, and as both are effective in resisting such increased draft the limit of forward movement of the outer portions of the sections is soon reached, it being understood that the tension of the cushioning devices is predetermined with a view of neutralizing any maximum draft that may be applied thereto.

It will be noted that if my invention be used with a team that is unequally matched as to strength and it be desired to neutralize the side draft which results from such conditions it will be only necessary to shorten or stiffen the cushioning device attached to the doubletree-section to which the weaker horse is hitched, thus producing greater resistance at that arm of the doubletree than at the arm to which the better puller is attached.

In lieu of the simple knuckle-joint shown in Figs. 1 and 2 I have illustrated in Figs. 3 and 4 what might be aptly termed a "compound" knuckle-joint. In this modified form the extension and socket are at one side of the median line of the sections and extend only half-way of the thickness or vertical diameter of the sections on continuous lines. Adjacent to the socket and extension the ends of the sections are beveled, as at $e^6$. The lower half of the sections are also provided with like sockets, extensions, and beveled ends, which break joints with the similar parts on the upper half, all of which is clearly shown in the drawings. This construction is especially adapted for doubletrees made from metal and avoids the necessity of having a plate for a top bearing for the inner ends of the sections.

Having thus described my invention, what I claim as new, and desire to obtain by Letters Patent, is—

1. A draft appliance consisting of a doubletree formed of independently-pivoted sections having a knuckle-joint therebetween.

2. A draft appliance consisting of a doubletree formed of sections independently pivoted, and having their inner ends coacting with a compound knuckle-joint therebetween.

3. A draft appliance consisting of a doubletree formed of independently-pivoted sections having their inner ends in frictional engagement, the inner end of one section having a rounded extension and a beveled portion adjacent thereto, and the inner end of the complementary section having a rounded socket, and a beveled portion adjacent thereto.

In testimony whereof I affix my signature in presence of two witnesses.

FRANK L. WOLVERTON.

Witnesses:
F. BENJAMIN,
L. G. SNOW.